July 3, 1928.

F. A. HAMILTON

TESTING MACHINE

Filed Jan. 5, 1926  3 Sheets-Sheet 1

Inventor
FERDINAND A. HAMILTON
By Munn & Co.
Attorney

July 3, 1928.
F. A. HAMILTON
TESTING MACHINE
Filed Jan. 5, 1926
1,675,802
3 Sheets-Sheet 2
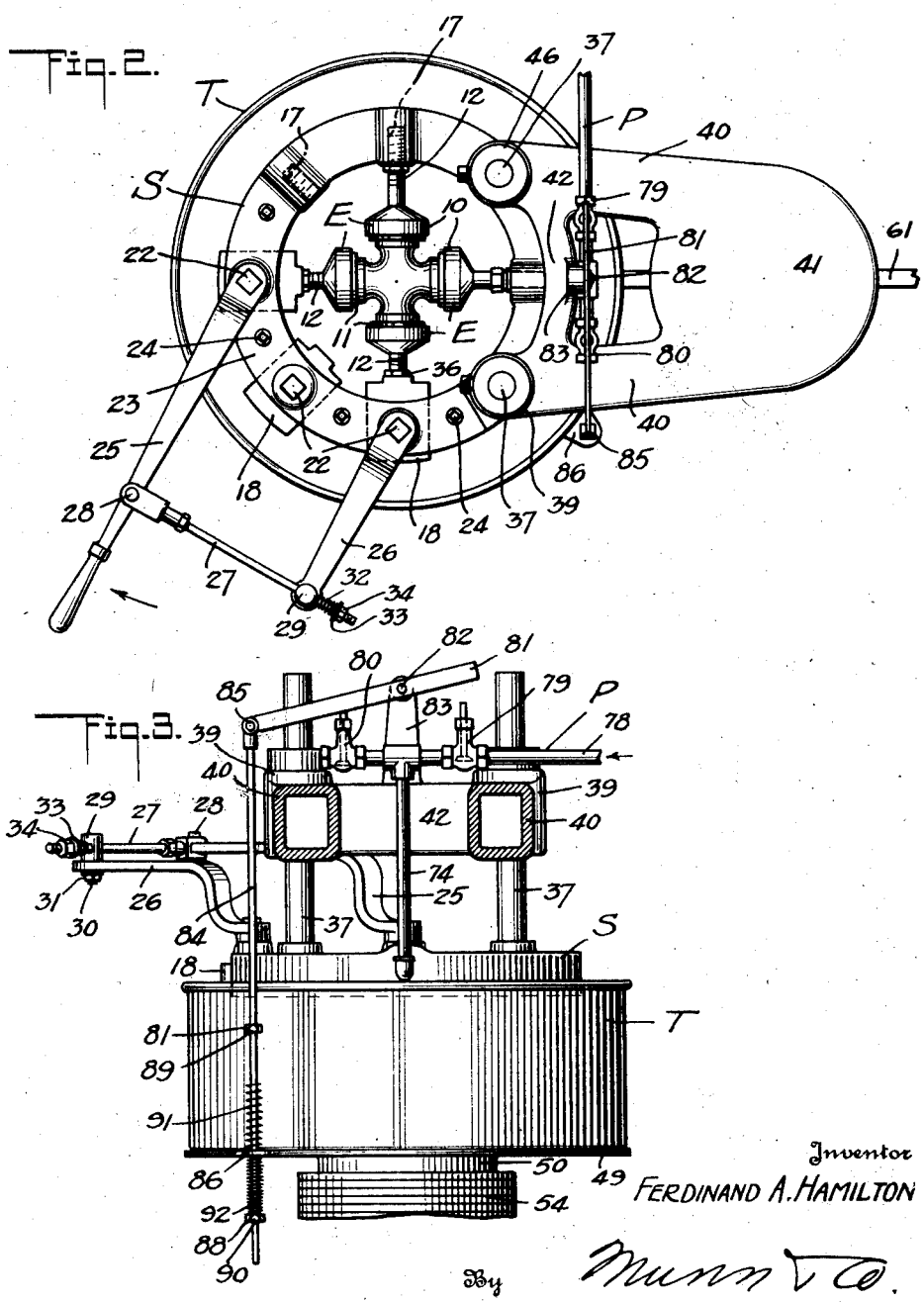
Inventor
FERDINAND A. HAMILTON
By Munn & Co.
Attorney July 3, 1928.
F. A. HAMILTON
TESTING MACHINE
Filed Jan. 5, 1926
3 Sheets-Sheet 3
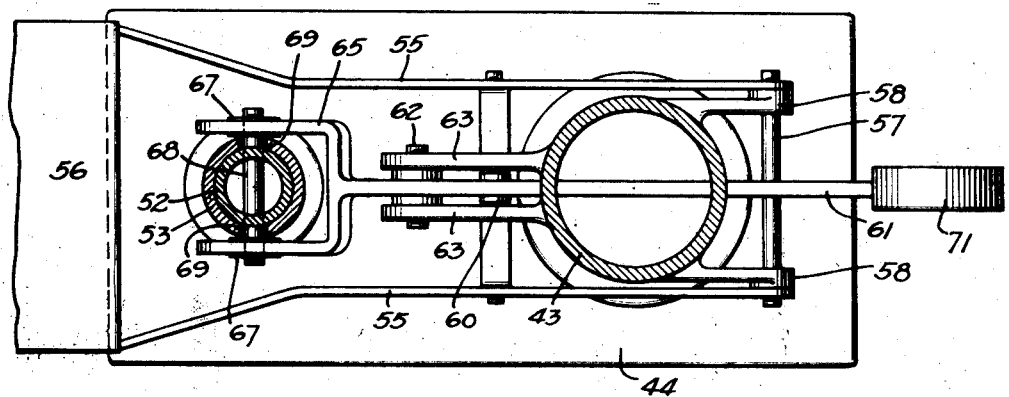
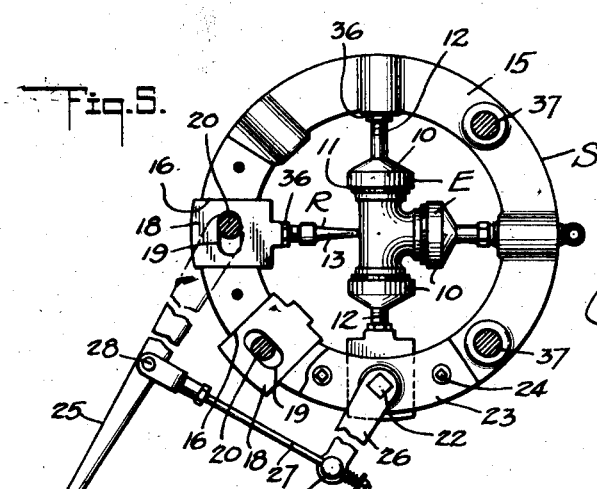
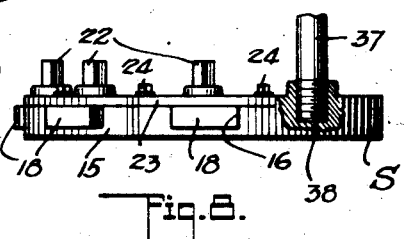
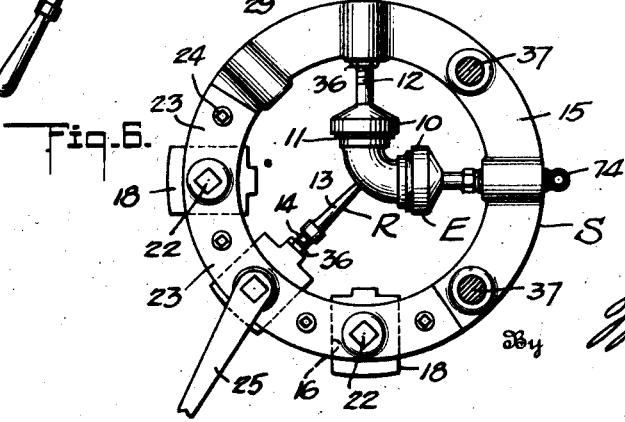
Inventor
FERDINAND A. HAMILTON
By Munn & Co.
Attorney Patented July 3, 1928.

1,675,802

UNITED STATES PATENT OFFICE.

FERDINAND A. HAMILTON, OF LOS ANGELES, CALIFORNIA, ASSIGNOR, BY DIRECT AND MESNE ASSIGNMENTS, TO SOUTHERN CALIFORNIA GAS COMPANY, A CORPORATION OF CALIFORNIA.

TESTING MACHINE.

Application filed January 5, 1926. Serial No. 79,432.

My invention relates generally to testing machines, and more particularly, although not necessarily, to a machine for testing pipe fittings and the like in such manner that flaws in the walls of the fitting such as, for instance, minute blow holes and cracks which would otherwise render the fitting unsuitable for use in pipe lines under pressure, can be quickly located.

A purpose of my invention is the provision of a machine of the above described character which essentially consists of fitting supporting and sealing means and a liquid supply means, one of which, preferably the liquid supply means, is movable to submerge and emerge the fitting.

Another purpose of my invention is the provision of means for supplying air under pressure to the interior of the sealed fitting, in timed relation with the submergence of the fitting in and its emergence from the liquid, thus insuring the economical use of the air and reducing the manual operations to a minimum.

A further purpose of my invention is the provision of a testing machine in which the fitting supporting and sealing device can be quickly adjusted to support fittings of various sizes and shapes with equal facility and dispatch and which operates to effectively clamp and hermetically seal the open ends of the fittings in a single operation.

I will describe only one form of testing machine embodying my invention, and will then point out the novel features thereof in claims.

In the accompanying drawings,

Figure 2 is a plan view of the machine embodied in Figure 1 and illustrating a +-shaped fitting in position to be tested;

Figure 3 is a vertical sectional view taken on the line 3—3 of Figure 1;

Figure 4 is a horizontal sectional view taken on the lines 4—4 of Figure 1;

Figures 5 and 6 are plan views of the fitting supporting and sealing device illustrating, respectively, a T-shaped fitting and an L-shaped fitting in position for testing;

Figure 7 is a view showing in side elevation the fitting supporting and sealing device; and Figure 8 is a perspective view of one of the elements comprised in the fitting supporting and sealing device.

Figure 1:
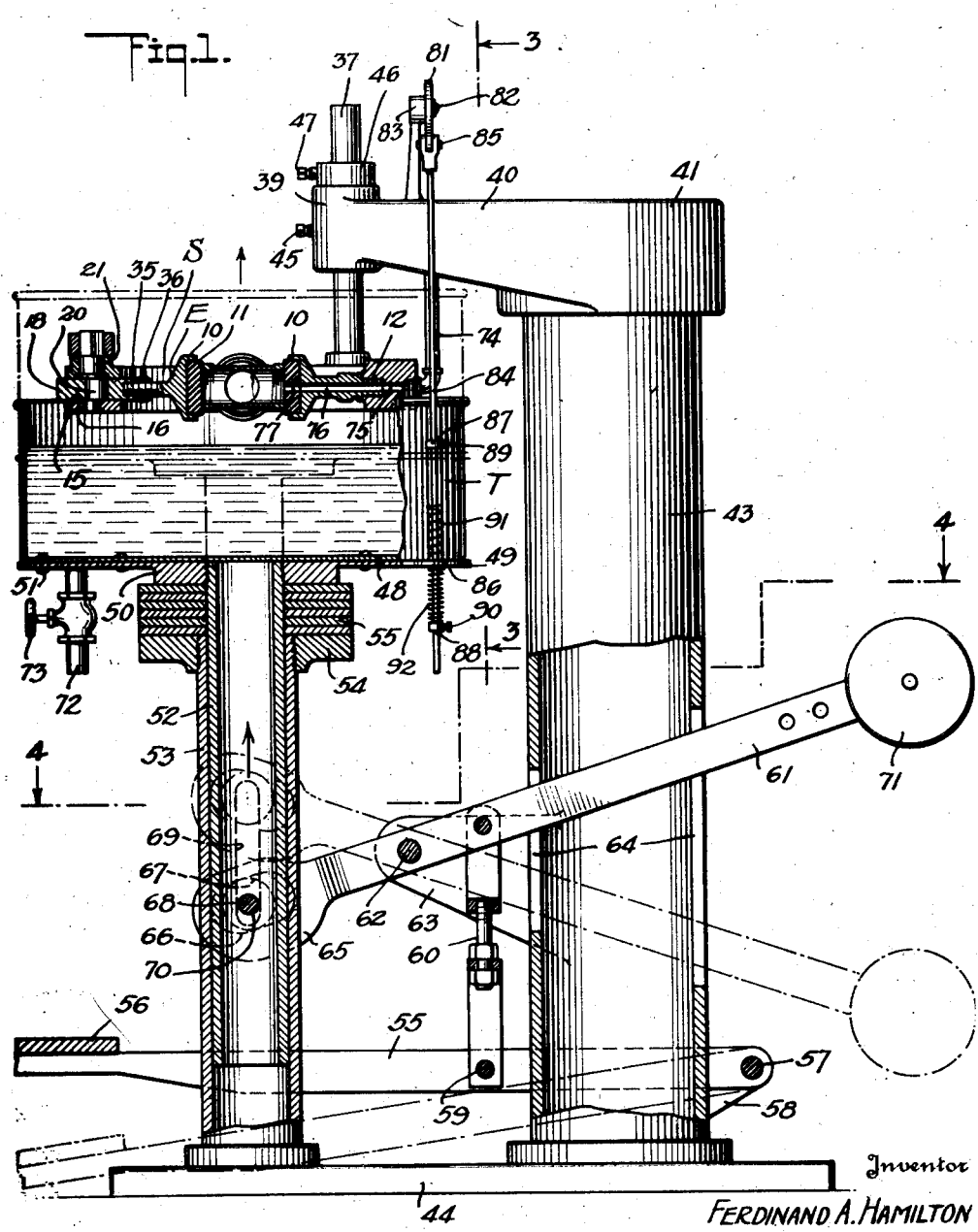
Figure 1 is a view showing partly in side elevation and partly in vertical section one form of testing machine embodying my invention.

Referring specifically to the drawings, in which similar reference characters refer to similar parts in each of the several views, my invention, in its present embodiment, comprises a fitting supporting and sealing device designated generally at S, in which fittings of various shapes, such as, for instance, crosses, T's and L's, are adapted to be supported and clamped with their open ends hermetically sealed. For this purpose, sealing elements designated generally at E and a ramming element R are provided. As shown in Figure 2, when testing a cross-shaped fitting sealing elements only are used, whereas when testing T's and L's, as shown, respectively, in Figures 5 and 6, the ram R is utilized in conjunction with the sealing elements.

Each of the sealing elements E, preferably, is constructed in the form of a disk 10 recessed upon one face, as clearly shown in Figure 1, to snugly receive a sealing gasket 11 of rubber or other suitable material, and the disk merges at its other face into an externally threaded shank 12. The ram R is preferably formed to provide a tapered pin 13 having a shank 14 threaded similarly to the shanks of the sealing elements.

The fitting supporting and sealing device S in the present instance comprises a head 15 in the form of an annulus of rectangular cross section having a plurality of radially disposed recesses 16 and threaded openings 17. In the recesses 16, substantially rectangular shaped blocks 18 having slots 19 extending transversely thereof are slidably mounted and are adapted to be moved inwardly and outwardly of the head by means of cams in the form of eccentrics 20 formed integral with stub shafts 21 rotatably mounted in the head with the eccentrics positioned within the slots 19. At one end of each of the shafts 21 is a shank 22 of angular form which projects freely through openings provided in an arcuate shaped cover plate 23 secured to the head 15 in spanning relation to the recesses 16 by means of bolts 24, thus preventing displacement of the blocks 18 and shafts 21 from the head.

Any one of the stub shafts 21 is adapted to be manually actuated by means of a hand lever 25 having an angularly shaped opening to receive any of the shanks 22, and it will be noted that when testing an L-shaped fitting the lever 25 only is used, whereas in the testing of crosses and T's an arm 26 having an angularly shaped opening receiving one of the shanks 22 is operatively connected to the lever 25 by means of a connecting rod 27 pivoted at one end to the lever at 28 and projecting freely through an opening formed in a post 29 having a reduced threaded shank 30 extending freely through an opening formed in the arm 26 and provided with a nut 31. To provide a resilient connection between the lever and arm a coiled expansible spring 32 surrounds the projecting end of the rod 27 and at one end engages a washer 33 abutting a nut 34.

As shown in Figures 1 and 2, the blocks 18 are further provided at their inner ends with threaded bores 35 and in the bores and threaded openings 17 in the head the shanks of either the sealing elements E or ram R are adapted to be received and locked against movement by means of lock nuts 36. By this arrangement, the sealing elements and ram are rendered interchangeable and adjustable inwardly and outwardly of the head and blocks 18 so that fittings of various shapes and sizes can be accommodated.

The head 15 is supported horizontally and in elevated position at a height convenient to an operator by means of a pair of upstanding rods 37 threaded at their lower ends as indicated at 38 into the head, with their upper ends projecting through sleeves 39 formed on the ends of the diverging arms 40 of a bracket 41 and connected by means of a stiffening web 42 to the upper end of a tubular standard 43 fixed upon a base plate 44. The rods 37 are adjustable vertically in the sleeves 39 and set-screws 45 are provided to secure them in adjusted position. To further support the weight of the head 15 in the sleeves, collars 46 engage the upper end of the sleeves and are secured to the rods 37 by means of set screws 47.

An open topped receptacle designated generally at T of a diameter sufficient to freely receive the head 15 and of such depth that a sufficient quantity of liquid such as light oil or water can be placed therein to completely submerge the head, is mounted below the latter for vertical movement to normally gravitate to the position shown in full lines in Figure 1 in which the level of the liquid in the receptacle is below the head 15, and is adapted to be elevated to the position shown in broken lines in which the head is submerged in the liquid. To this end the bottom wall 48 of the receptacle is secured to a circular plate 49 having a depending hub 50 by means of rivets 51. The hub is threaded internally to receive the upper threaded end of a tubular extension 52 slidably mounted in a second tubular standard 53 fixed to the base plate 44 and having a circular flange 54 threaded upon its upper end. A plurality of disks 55 of leather or other suitable material having central openings to freely receive the tubular extension 52 repose upon the flange 54 and function to absorb the impact of the receptacle T when gravitating from its elevated position.

To provide means for elevating the receptacle a foot treadle comprising a pair of levers 55 connected at their forward diverging ends by a platform 56 are pivoted upon a shaft 57 extending through registering openings in the rear end of the levers and brackets 58 formed integral with the standard 43. The treadle is in turn pivotally connected at 59 by a link 60 to a lever 61 pivoted upon a pin 62 extending through registering openings in brackets 63 formed on the standard 43 and having one of its ends extending through diametrically opposed slots 64 in the standard. The opposite end of the lever is bifurcated as shown at 65 to freely receive the standard 53 and the bifurcated ends are enlarged and provided with slots 66 in which are freely received anti-friction rollers 67 rotatably mounted on a pin 68 extending through diametrically opposed slots 69 formed in the standard 53 and through diametrically opposed openings 70 formed in the tubular extension 52. By this arrangement the receptacle T is adapted to be elevated by a depression of the platform 56 which acts through link 60, lever 61, and pin 68 to raise the extension 52 within its standard. To counterbalance the weight of the receptacle, a counterweight 71 is secured to the lever 61, and to provide means for draining the receptacle of liquid a drain pipe 72 provided with a valve 73 is secured to the bottom wall 15 of the receptacle in communication with its interior.

For the purpose of supplying air under pressure to the interior of a pipe fitting when clamped in the head 15 with its openings hermetically sealed, a supply pipe P connected to a suitable source of air under pressure (not shown) is provided with a vertical branch 74 passing between the arms 40 of the bracket 41 and secured to the head in communication with a duct 75 (Figure 1). One of the sealing elements E secured to the head and its gasket 11 are each formed with communicating ducts 76 and 77, respectively, registering with the duct 75 and thus providing a continuous passage through which air under pressure is adapted to be supplied to the interior of a fitting from the pipe P. The horizontal branch 78 of the pipe P is provided with an air admission valve 79 and an air vent valve 80 (Figure 3), the valves being of conventional type and normally urged to closed position. The valves are adapted to be alternately opened in timed relation to the elevating and gravitating movements of the receptacle T by means of a rocker arm 81 pivoted at 82 upon an upstanding bracket 83 formed integral with the web 42 and adapted to be actuated to alternately engage the valve stems of the valves 79 and 80 to open the valves, by means of a rod 84 pivoted to one end of the arm at 85 and extending downwardly alongside of the receptacle T so as to pass freely through an opening formed in a projection 86 on the plate 49. Abutments in the form of collars 87 and 88 are adjustably secured upon the rod at either side of the projection by means of set screws 89 and 90, respectively, and coiled expansible springs 91 and 92 surround the rod so as to be interposed between the projection and collars.

In operation with the sealing elements E arranged and locked in the head in receiving relation to the open ends of a fitting to be tested, and in the testing of T's and L's, with the ramming element R positioned to engage one wall of the fitting, the latter is interposed between the elements and the hand lever 25 actuated to move the movably mounted elements inwardly towards the center of the head so as to bring the open ends of the fitting into clamping engagement with the gaskets 11 and thus hermetically seal its openings. The platform 56 is now depressed by the foot of the operator to elevate the receptacle T from the position shown in full lines in Figure 1 to the position shown in broken lines and thus submerge the sealed fitting into the body of liquid. During this elevating movement, the spring 91 is engaged by the projection 86 on the plate 49 and is moved upwardly into engagement with the collar 87, continued elevating movement of the receptacle effecting movement of the collar to raise the rod 84, which latter, in turn, actuates the rocker arm 81 to open the valve 79 and permit air under pressure to be introduced into the interior of the fitting. Any leaks present in the walls of the fitting permit the passage of air into the body of liquid, the presence of the leaks being indicated by the air bubbles escaping from the liquid.

After a fitting has been tested, the treadle is released, allowing the receptacle to return to its original position so that the fitting is again emerged from the liquid. During this return movement of the receptacle, the projection 86 engages and compresses the spring 92, and through the spring and collar 88 moves the rod 84 downwardly, thus reversely actuating the rocker arm 81 to disengage the stem of the valve 79 and permit the latter to close and cut off the supply of air to the interior of the fitting. Continued downward movement of the rod causes the rocker arm to be moved into engagement with the stem of the valve 80 to open the latter and permit the air trapped in the fitting and branch pipe 74 to escape through the open valve to atmosphere.

From the foregoing description, it will be clear that I have provided a testing machine of substantial construction in which a fitting to be tested can be quickly clamped with its open ends hermetically sealed, then immersed into a body of liquid and subjected to internal pressure with a single operating movement and which is adjustable in such manner that fittings of many different shapes and sizes can be effectively tested, the construction and arrangement being such as to reduce the manual operations and the quantity of air used to a minimum.

I claim as my invention:

1. A testing machine of the character described comprising a fitting supporting and sealing device including a stationary head supported in elevated position and having fixed and movable sealing elements between which a fitting to be tested is adapted to be interposed and clamped with its openings hermetically sealed, a liquid containing receptacle mounted for movement to occupy one extreme position in which the fitting is emerged from the liquid and a second extreme position in which the fitting is submerged in the liquid, one of said sealing elements having a passage therethrough communicating with the interior of the fitting when clamped in the head, a pipe connected to a source of fluid supply under pressure and connected to said head in communication with said passage, a fluid admission valve and a fluid vent valve in said pipe, said valves normally urged to closed position, and means operatively connected to said receptacle for alternately opening said valves to either admit fluid to the interior of the fitting or vent the interior of the fitting to atmosphere according as the fitting is submerged or emerged.

2. A testing machine of the character described, comprising a fitting supporting and sealing device, a liquid containing receptacle mounted for movement to occupy one position in which a fitting supported by said means is disposed above the level of liquid in the receptacle and another position in which the fitting is submerged in the liquid, air supply means through which air under pressure is adapted to be introduced into the interior of the sealed fitting, air admission and vent valves incorporated in such air supply means, said valves normally urged to closed position, and means for alternately opening said valves in timed relation to the movements of the receptacle so as to admit air to the interior of the fitting when the fitting is submerged in the liquid and to vent the interior of the fitting to atmosphere when emerged.

3. A testing machine as embodied in claim 2 wherein said last means comprises a rocker arm pivoted on a support and adapted to alternately engage the stems of said valves, a rod connected to said arm, abutments on the rod, and a projection on said receptacle adapted to engage one or the other of said abutments according as the receptacle moves to either of said positions and thereby actuate the rocker arm to open one of said valves.

4. A testing machine of the character described, comprising fitting supporting and sealing means, a liquid receptacle mounted for movement to occupy one position in which a fitting supported by said means is above the level of liquid in the receptacle and another position in which it is elevated to submerge the fitting, and means operating concurrently with the elevation of the receptacle to supply air under pressure to the interior of the fitting following its submergence, and operating concurrently with the lowering of the receptacle to vent the interior of the fitting of the air supplied to the latter.

5. A testing machine of the character described comprising means by which a pipe fitting is supported with its openings hermetically sealed, liquid supply means into which the first means is adapted to be submerged with the fitting, the liquid supply means being movable to occupy one position in which the fitting is emerged from the liquid and another position in which the fitting is submerged, and valved means operating concurrently with the movement of the liquid supply means to admit air under pressure to the interior of the fitting after the latter is submerged and to vent the interior of the fitting to atmosphere during emergence of the fitting.

6. In a testing machine, a fitting supporting and sealing device including fixed sealing elements and a movable sealing element arranged in receiving relation to the open ends of a fitting to be tested, means for moving the movable element to effect clamping engagement of the elements with the fitting, a ram mounted for movement, and means for moving the ram to engage the fitting and thereby force the open ends of the latter into sealing engagement with the sealing elements.

7. In a testing machine of the character described, a fitting supporting and sealing device comprising a head, fixed and movable sealing elements carried by the head and between which a fitting is adapted to be interposed, said fixed sealing elements comprising sealing plugs and said movable sealing elements comprising slotted blocks slidably mounted in the head and carrying other plugs, shafts rotatable in the head and having cams thereon disposed in said slots, and means for rotating said shaft to effect movement of the blocks in said head to thereby clamp the fitting between the elements and hermetically seal its openings.

8. A testing machine of the character described comprising a base, a standard fixed to the base and having a lateral extension, a fitting supporting and sealing device supported on said extension in elevated position, a second standard of tubular form, an open topped receptacle adapted to contain a supply of liquid and having a depending extension slidable in said second standard, said receptacle normally gravitating to a position in which a fitting supported in said device is disposed above the level of liquid and adapted to be elevated to submerge the fitting in the liquid, actuating means operatively connected to the receptacle for elevating the latter, means for introducing air under pressure to the interior of the submerged fitting, and cushioning means interposed between said second standard and receptacle for absorbing the impact of the receptacle when gravitating to its normal position.

9. A testing machine of the character described comprising a base, a standard fixed to the base and having a lateral extension, a fitting supporting and sealing device supported on said extension in elevated position, a second standard of tubular form, an open topped receptacle adapted to contain a supply of liquid and having a depending extension slidable in said second standard, said receptacle normally gravitating to a position in which a fitting supported in said device is disposed above the level of liquid and adapted to be elevated to submerge the fitting in the liquid, and actuating means for elevating the receptacle comprising a lever pivoted on the first standard and having a pin and slot connection with said extension, a foot treadle pivoted on the first standard, a link connecting the lever and treadle, and a weight on the lever for counterbalancing the weight on the receptacle.

FERDINAND A. HAMILTON.